United States Patent [19]

Upson et al.

[11] 4,448,850

[45] May 15, 1984

[54] VINYL ACETATE POLYMERS AND LATEX COMPOSITIONS CONTAINING SAME

[75] Inventors: Donald A. Upson, Webster; David J. Steklenski, Rochester, both of N.Y.

[73] Assignee: Eastman Kodak Company, Rochester, N.Y.

[21] Appl. No.: 401,205

[22] Filed: Jul. 23, 1982

[51] Int. Cl.[3] ........................ B32B 27/28; B32B 27/30; G03C 5/54; G03C 1/76

[52] U.S. Cl. ........................ 428/510; 428/522; 427/385.5; 427/389.9; 430/269; 430/215; 430/536; 430/545; 430/627; 430/634; 430/566; 430/559; 430/570; 526/310

[58] Field of Search ............... 430/269, 215, 536, 545, 430/627, 634, 213, 510, 512, 566, 559, 570, 427; 428/522, 510; 427/385.5, 389.9; 526/317, 310, 318, 923; 525/936

[56] References Cited

U.S. PATENT DOCUMENTS

| | | | |
|---|---|---|---|
| 3,446,767 | 5/1969 | Nolan . | |
| 3,615,557 | 10/1971 | D'Cruz | 430/536 X |
| 3,749,577 | 7/1973 | Hollister et al. | 430/627 X |
| 3,790,533 | 2/1974 | Samour | 526/310 X |
| 3,947,396 | 3/1976 | Kangas et al. | 526/310 X |
| 4,022,743 | 5/1977 | Patella et al. . | |
| 4,066,820 | 1/1978 | Kelly et al. . | |
| 4,129,711 | 12/1978 | Viout et al. | 526/317 X |
| 4,199,363 | 4/1980 | Chen | 430/512 |
| 4,368,258 | 1/1983 | Fujiwhara et al. | 430/627 X |

OTHER PUBLICATIONS

O. Fuchs and H. H. Suhr, "Solvents and Non-Solvents for Polymers", J. Bandrup and E. H. Immergut (eds), *Polymer Handbook* (2nd ed): John Wiley & Sons, Inc., New York, 1975, pp. IV-243-244.

*Primary Examiner*—John E. Kittle
*Assistant Examiner*—Cynthia Hamilton
*Attorney, Agent, or Firm*—John R. Everett

[57] ABSTRACT

Polymers having excellent adherence to film supports such as cellulose acetate are disclosed. The polymers comprise random recurring units having the structure $$-(A)_w, -(B)_x, -(C)_y \text{ and } -(D)_z$$

wherein;

A represents polymerized vinyl acetate;

B represents a polymerized acrylate or methacrylate monomer capable of copolymerization with vinyl acetate;

C represents a polymerized monomer selected from the group consisting of methacrylic acid, itaconic acid and vinylbenzoic acid;

D represents a polymerized cationically charged copolymerizable monomer;

w represents from 20 to 85 weight percent;

x represents from 5 to 65 weight percent;

y represents from 5 to 50 weight percent and;

z represents from 0 to 15 weight percent.

9 Claims, No Drawings

VINYL ACETATE POLYMERS AND LATEX COMPOSITIONS CONTAINING SAME

FIELD OF THE INVENTION

The present invention relates to novel polymers comprising vinyl acetate and to latex compositions and elements comprising such polymers.

BACKGROUND OF THE INVENTION

The use of cellulose acetate as a support in articles of manufacture such as photographic elements is well known. In general, organic solvents which cause cellulose acetate to swell have been used to coat polymer layers on cellulose acetate supports. The swelling promotes adhesion between the polymeric layer and the cellulose acetate support. Aqueous polymer compositions generally have not been used to coat polymeric layers on cellulose acetate supports because such layers have not adhered sufficiently to such supports.

There are several disadvantages to the use of only organic solvents in coating polymer layers on cellulose acetate supports. Elaborate and costly machinery is required to prevent escape of organic solvent vapors into the environment. In addition, the solvents themselves are costly and are generally flammable. Such solvents frequently cause the cellulose acetate film base to curl. Control over curl is possible but not without compromising coating versatility or expenditure of additional energy.

The use of organic solvent-water mixtures has been considered for coating polymer layers on the cellulose acetate supports. However, use of such solvent mixtures necessitates recovery of the organic solvents to prevent the escape into the environment. The presence of water in the solvents complicates the recovery process.

It is important that coated layers on cellulose acetate supports to be used in photographic elements be able to withstand normal photographic alkaline processing without undergoing any change in adhesion or other properties. It is also important, from an economic standpoint that film scraps such as perforations and waste film be convertable back to an uncoated condition. Treated scraps can then be redissolved and reused in film support manufacturing. Hence, a useful polymeric layer on cellulose acetate film supports must withstand alkaline photographic processing but be dissolved in the alkaline recovery process.

SUMMARY OF THE INVENTION

The present invention provides novel polymers useful in coatings which have excellent adherence to film supports such as cellulose acetate. When the layer containing the polymer of this invention is overcoated with another hydrophobic polymer, its adherence to cellulose acetate supports, withstands normal alkaline photographic processing conditions. In addition, the layer readily dissolves in the alkaline solution used in alkaline recovery processes designed to recycle cellulose acetate film scraps. These polymers are also loadable with hydrophobic materials.

The polymer prepared as a latex, has the random recurring units having the structures:

$$-(A)_w, -B)_x, -(C)_y \text{ and } -(D)_z$$

wherein;

A represents polymerized vinyl acetate;

B represents a polymerized acrylate or methacrylate monomer capable of copolymerization with vinyl acetate;

C represents a polymerized monomer selected from the group consisting of methacrylic acid, itaconic acid and vinylbenzoic acid;

D represents a polymerized cationically charged copolymerizable monomer;

w represents from 20 to 85 weight percent;

x represents from 5 to 65 weight percent;

y represents from 5 to 50 weight percent and;

z represents from 0 to 15 weight percent.

Useful polymer layers are formed from the latex which comprises an aqueous continuous phase having dispersed therein polymer particles of the invention. The loadable polymer particles are less than about 0.2 micron in diameter in the latex composition.

By "loadable" we mean that the polymers are able to pass the "loadable polymer particle test" referred to hereinafter. The loadable polymers are, if desired, loaded with useful materials (hydrophobes) which are normally insoluble in an aqueous medium. By "loaded" we mean that the hydrophobe is absorbed in, dissolved in, dispersed in or absorbed to the polymer portion of the latex composition.

PREFERRED EMBODIMENTS OF THE INVENTION

The preferred polymers have the above described structure wherein

B represents polymerized tetrahydrofurfuryl methacrylate, n-butyl acrylate, methoxyethyl acrylate, ethyl acrylate or methyl methacrylate;

C represents polymerized methacrylic acid and;

D represents polymerized N-(2-methacryloyloxyethyl)-N,N,N-trimethylammonium methosulfate; N,N,N-trimethyl-N-vinylbenzylammonium chloride or N-(3-methacrylamidopropyl)-N,N,N-trimethylammonium chloride;

w represents from 30 to 70 weight percent;

x represents from 10 to 43 weight percent;

y represents from 10 to 30 weight percent and;

z represents from 2 to 10 weight percent.

DETAILED DESCRIPTION OF THE INVENTION

The polymers of the invention are conveniently prepared as a latex by known emulsion polymerization techniques. Descriptions of such techniques are disclosed in W. P. Sorenson and T. W. Campbell "Preparative Methods of Polymer Chemistry," 2nd Edition, N.Y., N.Y., Wiley (1968) and M. P. Stevens "*Polymer Chemistry—an Introduction,*" Addison-Wesley Publishing Co., Reading, Mass. (1975).

Generally, the polymers are prepared by:

(a) dissolving a surfactant and a polymerization catalyst in deoxygenated water;

(b) mixing the solution of (a) in a head tank with a mixture consisting of from 20 to 85 weight percent of vinyl acetate; from 5 to 65 weight percent of an acrylate or methacrylate monomer capable of copolymerization with vinyl acetate; from 5 to 50 weight percent of a carboxyl group-containing monomer which forms a water-insoluble homopolymer such as methacyclic acid and from 0 to 15 weight percent of a cationically charged monomer;

(c) adding a solution of the surfactant and polymerization catalyst to a reactor;
(d) adjusting the solution in the reactor to a pH of between 3 and 4;
(e) heating the reactor;
(f) reacting the mixture of (b) by adding the mixture to the reactor over a period of about 1 hour;
(g) continuing the reaction for at least 1 hour;
(h) cooling the reactor and filtering the contents.

Useful surfactants include hexadecyltrimethylammonium bromide, representive of cationic surfactants and Igepal CO-730 (an ethoxylated nonylphenol) representative of non-ionic surfactants.

Useful catalysts include 2,2'-azobis-(2-amidinopropane.hydrochloride), 2,2'-azobis-(2-methylpropionitrile), and hydrogen peroxide.

Examples of polymers made according to the previously described method are disclosed in Table I.

TABLE I

| Polymer | Monomer Weight Ratio |
|---|---|
| 1. Poly(vinyl acetate-co-tetrahydrofurfuryl methacrylate-co-methacrylic acid-co-N—2-methacryloyloxyethyl-N,N,N—trimethylammonium methosulfate) | 55/20/20/5 |
| 2. Poly(vinyl acetate-co-tetrahydrofurfuryl methacrylate-co-methacrylic acid-co-N—2-methacryloyloxyethyl-N,N,N—trimethylammonium methosulfate) | 65/20/10/5 |
| 3. Poly(vinyl acetate-co-n-butyl acrylate-co-methacrylic acid-co-N—2-methacryloyloxyethyl-N,N,N—trimethylammonium methosulfate) | 60/20/15/5 |
| 4. Poly[vinyl acetate-co-tetrahydrofurfuryl methacrylate-co-methacrylic acid-co-N—(3-methacrylamidopropyl)-N,N,N—trimethylammonium chloride] | 55/20/20/5 |
| 5. Poly(vinyl acetate-co-tetrahydrofurfuryl methacrylate-co-methacrylic acid-co-N,N,N—trimethyl-N—vinylbenzylammonium chloride) | 55/20/20/5 |
| 6. Poly(vinyl acetate-co-methoxyethyl acrylate-co-methacrylic acid-co-N—2-methacryloyloxyethyl-N,N,N—trimethylammonium methosulfate) | 60/20/15/5 |

The resulting latex, comprising a polymer of this invention, is used, when desired, to prepare latex compositions comprising a loaded polymer of the invention.

The monomers useful in forming component B of the polymer are acrylates and methacrylates which are capable of copolymerizing with vinyl acetate.

Examples of acrylates include methyl acrylate, ethyl acrylate, propyl acrylate, butyl acrylate, amyl acrylate, 2-ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl acrylate, furfuryl acrylate, tetrahydrofurfuryl acrylate, phenyl acrylate, and the like.

Examples of methacrylates include methyl methacrylate, ethyl methacrylate, propyl methacrylate, isopropyl methacrylate, butyl methacrylate, amyl methacrylate, hexyl methacrylate, cyclohexyl methacrylate, benzyl methacrylate, cyanoacetoxyethyl methacrylate, chlorobenzyl methacrylate, octyl methacrylate, N-ethyl-N-phenylaminoethyl methacrylate, 2-methoxyethyl methacrylate, 2-(3-phenylpropyloxy)-ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, and the like.

Component C is a polymerized vinyl monomer selected from the group consisting of methacrylic acid, itaconic acid and vinylbenzoic acid.

Component D is a polymerized monomer with a cationic group. Examples of such monomers include:

N-(2-methacryloyloxyethyl)-N,N,N-trimethylammonium methosulfate; N,N,N-trimethyl-N-vinylbenzylammonium chloride and N-(3-Methacrylamidopropyl)-N,N,N-trimethylammonium chloride.

The loaded polymer latex compositions of this invention consist of an aqueous continuous phase and a dispersed or discontinuous polymer particle phase in which one or more hydrophobic compounds is loaded in the polymer particles.

The process of loading (dispersing or dissolving) a hydrophobic compound within loadable polymer particles is accomplished in the following manner, as described in U.S. Pat. Nos. 4,214,047 and 4,199,363.

The hydrophobic compound (or hydrophobe) to be loaded is dissolved in a water-miscible organic solvent. An aqueous latex consisting essentially of water as a continuous phase and loadable polymer particles as a dispersed phase is then blended into the water-miscible organic solvent containing the hydrophobe. Blending is undertaken so that the hydrophobe remains in solution and the loadable polymer particles remain dispersed. That is, separation of the hydrophobe or coagulation of the polymer particles is avoided.

By avoiding separation or coagulation of the hydrophobe or the polymer particles, a two-phase mixture is established in which the mixture of water miscible organic solvent and water constitutes a continuous phase and the polymer particles constitute a second discontinuous phase. Initially, the hydrophobe is within the water-miscible organic solvent. In the two phase mixture resulting from blending, the hydrophobe is brought into intimate association with both the continuous and the dispersed phases. The hydrophobe is then free to distribute itself between these phases based on its relative solubilities therein. Dilution of the water-miscible organic solvent with water by blending has the effect of reducing the affinity of the hydrophobe for the continuous phase. Thus, the introduction of water has the effect of driving or shifting the equilibrium distribution of the hydrophobe away from the continuous phase and toward the dispersed phase. The presence of water (or an increased amount of water, if some water was initially present in the water-miscible organic solvent) causes the hydrophobe to redistribute itself between the continuous and dispersed phases. In this way a portion of the hydrophobe becomes dispersed or dissolved in the polymer particles, so that the polymer particles become loaded with hydrophobe. This loading procedure requires that the hydrophobe remain dissolved until associated with the polymer particle.

In most instances all the water desired to dilute the water-miscible organic solvent and shift the equilibrium distribution of the hydrophobe is present in the aqueous latex during initial blending. Where it is desired to introduce additional water, as where a concentrated latex is employed, additional water is blended with the loaded latex composition resulting from the initial step of blending. The additional water has the effect of further reducing the affinity of the hydrophobe for the continuous phase. This further drives or shifts the equilibrium distribution of the hydrophobe away from the continuous phase toward the dispersed phase and further contributes to loading the polymer particles with hydrophobe.

While blending of water and loadable polymer particles with the water-miscible organic solvent containing hydrophobe dissolved therein results in significant loading of the hydrophobe into the polymer particles, a substantial portion of the hydrophobe remains in the continuous phase dissolved in the water-miscible organic solvent. Further loading of the hydrophobe into the polymer particles can be achieved by removing water-miscible organic solvent from the continuous phase. This has the effect of further increasing the affinity of the hydrophobe for the dispersed phase. It is preferred to remove at least a major portion—in other words, at least about half—of the water-miscible organic solvent. This drives or shifts the equilibrium distribution of the hydrophobe away from the continuous phase toward the dispersed phase. A still higher proportion of hydrophobe becomes dissolved or dispersed in the polymer particles so that their loading is further increased.

It is unnecessary to practice all of the loading steps indicated above following initial blending and loading. For certain applications the loaded latex composition resulting from initial blending and loading is used directly, or the loaded polymer particles can be separated from the continuous phase and used directly.

The water-miscible organic solvents useful in the practice of this loading process are those which:

a. can be dissolved in (i.e., are "miscible" with) distilled water at 20° C. to the extent of at least about 20 parts by volume of solvent in 80 parts by volume of water;
b. have boiling points (at atmospheric pressure) above about −10° C.;
c. do not detrimentally react chemically with aqueous latexes containing the loadable polymer particles which are useful in the practice of this process; and
d. do not dissolve more than about 5 weight percent of such loadable polymer particles in the aqueous latex at 20° C.

Non-limiting examples of such useful water-miscible organic solvents are water-miscible alcohols, ketones and amides (e.g. acetone, ethyl alcohol, methyl alcohol, isopropyl alcohol, dimethylformamide, methyl ethyl ketone), tetrahydrofuran, N-methyl-2-pyrrolidone, dimethyl sulfoxide and mixtures thereof. Of these, acetone, dimethylformamide and/or tetrahydrofuran are preferred when the hydrophobic material in question is soluble therein.

The latices which are employed in the practice of the process consist essentially of water as a continuous phase and loadable polymer particles as a dispersed phase. The instant loadable polymer particles meet the Loadable Polymer Particle Test.

LOADABLE POLYMER PARTICLE TEST

At 25° C., the loadable polymer particles being tested are (a) capable of forming a latex with water at a polymer particle concentration of from 10 to 20 percent by weight, based on total weight of the latex, and (b) when 100 ml of the latex is then mixed with an equal volume of the water-miscible organic solvent to be employed in forming the loaded polymeric latex composition desired, stirred and allowed to stand for 10 minutes, exhibit no observable coagulation of the polymer particles.

The latex is characterized in that the loadable polymer particles are generally highly dispersed as compared to coupler solvent and similar hydrophobic particle dispersions and hydrophilic colloid coatings. The loadable polymer particles exhibit an average diameter in the range of from 0.002 to 0.2 micron, preferably in the range of from about 0.02 to 0.08 micron. Although some swelling can occur during loading, the loaded polymer particles also typically and preferably fall within these same ranges of average diameters. The loadable polymer particles form at least 2 percent by weight of the aqueous latex and preferably form at least 10 percent by weight thereof. Preferably the aqueous latex contains about 20 percent by weight or less of the loadable polymer particles.

To be considered a hydrophobic compound as that term is employed herein, the compound must be essentially insoluble in distilled water at 25° C. Preferably the dissolved concentration of hydrophobe in water under these conditions is less than 0.5 percent by weight, based on the weight of the water. Any such hydrophobe is employed in the practice of this process which can be dissolved in a liquid consisting of one or a mixture of water-miscible organic solvents. Preferably the hydrophobe is soluble in a concentration of at least 5 percent by weight, based on the total weight of the water-miscible organic solvent and dissolved hydrophobe. In practice, minor amounts of essentially diluent materials, such as minor amounts of water commonly entrained in water-miscible solvents, are associated with the blended hydrophobe and water-miscible organic solvent; however, the hydrophobe and water-miscible organic solvent or solvents are chosen so that additional materials, such as pH or other modifiers—e.g. acid or alkali—are not required to dissolve the hydrophobe.

Specifically preferred hydrophobic photographic addenda of this type include those used to perform coupling, silver halide development, oxidized developer scavenging, spectral sensitizing or desensitizing, diffusion transfer dye image-forming and visible or ultraviolet light absorbing functions when incorporated in a silver halide photographic element. Other hydrophobic photographic addenda encompass those used in silver halide photographic elements as brighteners, antistats, antioxidants, silver halide solvents, bleachable dyes in silver-dye-bleach imaging processes and the like. All those hydrophobic photographic addenda which have been conventionally introduced into hydrophillic colloid layers of photographic elements in coupler-solvent and similar high boiling organic solvent droplets are ideally suited for use in the practice of this invention.

In terms of end photographic uses all of the hydrophobic photographic addenda useful as hydrophobes in the practice of this process can be introduced in their conventional concentrations and locations within photographic materials and elements. Such photographic materials and elements are well known to chemists skilled in the photographic arts and need not be discussed in detail herein. Photographic materials in the preparation of which the process of the present invention is especially useful include, for example, image transfer materials, physical development materials, radiographic materials, dry development systems, color-forming materials, and the like, such as are described in *Product Licensing Index,* Vol. 92, December, 1971, pages 107-110, and in British Pat. No. 923,045.

Examples of some of the photographically useful loaded latex compositions of the present invention include compositions which comprise a loadable polymer, as described herein loaded with one or more hydrophobic materials, as described above. Generally the amount of hydrophobe which is present in intimate association with the polymer particles of the latex is anywhere within the range of from 1:40 to 3:1 in terms of a weight ratio of hydrophobe to loadable polymer. It is preferred that the weight ratio of hydrophobe to loadable polymer in the latex be from about 1:10 to 2:1, optimally from about 1:5 to 1:1.

Generally the proportion of aqueous latex added to the water-miscible organic solvent containing hydrophobe is maintained in the volume ratio of 1:4 to 20:1, preferably 1:1 to 10:1. Not all of the water added, however, need be present in the aqueous latex. It is contemplated that a portion of the water which might be blended in the aqueous latex is added subsequent to blending the aqueous latex and water-miscible organic solvent.

Where it is desired to coat hydrophilic colloid layers, as in photographic applications and elements, the polymer particles, loadable or loaded, of the latex, are chosen to be readily dispersible in a hydrophilic colloid composition, such as an aqueous gelatin solution. This is accomplished by employing particles consisting essentially of loadable polymers of the type defined herein. This allows the hydrophilic colloid composition to be uniformly blended with the loadable or loaded latex composition. The resulting hydrophilic colloid containing latex composition is then coated onto a suitable substrate, such as a conventional photographic support. Water and, if any is present, water-miscible organic solvent are then removed from the coating so that a solid hydrophilic colloid coating results. Depending upon the specific photographic application, the hydrophilic coating containing the polymer particles is the sole coating on the support, an undercoat, interlayer or overcoat. In one useful embodiment the polymer particles are incorporated in a gelatinosilver halide emulsion layer of a photographic element.

The latex compositions loaded or unloaded, with or without a hydrophilic colloid, are coated as layers onto a useful support, such as a conventional photographic support particularly cellulose acetate, using conventional techniques. It is specifically contemplated to coat the latex compositions of the invention using coating hoppers and other apparatus conventionally employed in the photographic arts for forming single or multiple coatings on photographic supports. Useful coating techniques and supports are described in the *Product Licensing Index,* Vol. 92, pages 107-110, December, 1971, and the publications referred to therein.

Although the above described layers are particularly useful in photographic elements, the present invention is not limited to photographic materials and processes, but is useful wherever it is deemed desirable to obtain, for example, a distribution of a hydrophobe through a polymeric material or form layers on supports such as cellulose acetate. Although the distribution of hydrophobe through polymeric material is generally used ultimately in a layer on a substrate or support, other end uses are contemplated which do not involve the use of supports. For example, useful hydrophobes include insecticides, herbicides, paint pigments, minerals, hormones, vitamins, enzymes and the like.

The following examples are presented to further illustrate this invention:

PREPARATION OF LATEX COMPOSITION COMPRISING

Polymer 1, Table I

A solution of 0.33 g of hexadecyltrimethylammonium bromide surfactant, 0.167 g of Igepal CO-730 surfactant and 0.70 g of 2,2'-azobis(2-amidinopropane) dihydrochloride in 100 g of deoxygenated water is prepared in a header tank. Fifty-five grams of vinyl acetate, 22.2 g of tetrahydrofurfuryl methacrylate (90% active), 20 g of methacrylic acid, and 5 g of N-(2-methacryloyloxyethyl)N,N,N-trimethylammoniummethosulfate are added to this solution with stirring. A reactor is prepared by dissolving 0.67 g of hexadecyltrimethylammonium bromide surfactant and 0.33 g of Igepal CO-730 in 460 g deoxygenated water. The pH of the reactor is lowered to 3-4 with aqueous hydrochloric acid. The head tank contents are added to the reactor over a 60 minute period. The reaction is continued at 68° C. for 4 hours. The thus formed latex is cooled, filtered and used directly.

EXAMPLE 1

Latex Polymer 1 above as a Vehicle for Photographic Addenda and Coated Layers on Cellulose Acetate Support Latex Polymer 1 above was loaded with a photographically useful hydrophobe as in Example 11 or 12 of U.S. Pat. No. 4,199,363. This loaded latex was coated on untreated cellulose acetate film support at a dry total coverage of 6.0 mg/ft$^2$ (66 mg/m$^2$). This loaded latex layer was then overcoated with a solution of poly(-methyl methacrylate) in acetone/n-butanol (95/5) at a total dry coverage of 70 mg/ft$^2$ (770 mg/m$^2$). Adhesion of both the latex-derived layer to the support, and the overcoated 2-layer system to the support were excellent as judged by a cross-hatch adhesion test. In this test, the coated layers were scored to the film base with a razor blade in a cross-hatch pattern. Scotch tape was firmly applied and then ripped away from the film. For adhesion to be termed excellent, none of the coated layer is removed by the tape.

The above described element was soaked in Kodak Rapid X-Ray Developer, an alkaline photographic developer, pH 10.2, at 38° C. for 10 minutes. There was no effect on the properties or appearance of either the overcoat or the latex underlayer of this invention.

The element was then treated with 0.14% aqueous NaOH for 30 minutes at 95° C. Both the overcoat layer and the latex layer containing the hydrophobe were quantitatively removed. The overcoat came off as dust-like, insoluble, non-tacky particles or flakes which were easily filtered away from the film. The loaded latex layer dissolved and was easily filtered away from the film. The remaining film support was dissolved in $CH_2Cl_2/CH_3OH$ (95/5) to give a clear dope, free of particulate matter. The dope was cast to give a clear film. Presence of any of the latex layer, the hydrophobe and the overcoat layer were all undetectable spectrally.

EXAMPLE 2

Aqueous Coatings on Poly(ethylene terephthalate) Support

This example is included to demonstrate the broad applicability of the latex polymers of this invention.

Latex Polymer 1, loaded with a hydrophobe as described in Example 1 was coated on subbed poly(ethylene terephthalate) film support at a dry total coverage of 6.0 mg/ft$^2$ (66 mg/m$^2$). The layer was then overcoated with an aqueous latex of poly(methyl methacrylate) at a total dry coverage of 70 mg/ft$^2$ (770 mg/m$^2$). Resorcinol was used as a coalescing aid. Adhesion of both layers was excellent as judged by the cross-hatch adhesion test.

As in Example 1, the coatings of this example were unaffected by the relatively mild alkaline treatment with photographic developer. On treatment with 0.14% NaOH and 0.005% hexadecyltrimethylammonium bromide in water at 95° C. for 30 min., quantitative removal of both layers occurred. As in Example 1, the overcoat was removed as dust-like particles or flakes which were easily filtered off along with the dissolved polymer of this invention.

The invention has been described in detail with particular reference to preferred embodiments thereof, but it will be understood that variations and modifications can be effected within the spirit and scope of the invention.

We claim:

1. An element comprising a support having thereon a layer comprising a polymer characterized in that the polymer has random recurring units:

$$-(A)_w-,\ -(B)_x-,\ -(C)_y- \text{ and } -(D)_z-$$

wherein;

A represents polymerized vinyl acetate;

B represents a polymerized acrylate or methacrylate monomer capable of copolymerization with vinyl acetate;

C represents a polymerized monomer selected from the group consisting of methacrylic acid, itaconic acid and vinylbenzoic acid;

D represents a polymerized cationically charged copolymerizable monomer;

w represents from 20 to 85 weight percent;

x represents from 5 to 65 weight percent;

y represents from 5 to 50 weight percent and, z represents from 2 to 10 weight percent.

2. A photographic element comprising a support having thereon a layer comprising a polymer characterized in that the polymer comprises random recurring units having the structures:

$$-(A)_w-,\ -(B)_x-,\ -(C)_y- \text{ and } -(D)_z-$$

wherein;

A represents polymerized vinyl acetate;

B represents a polymerized acrylate or methacrylate monomer capable of copolymerization with vinyl acetate;

C represents a polymerized monomer selected from the group consisting of methacrylic acid, itaconic acid and vinylbenzoic acid;

D represents a polymerized cationically charged copolymerizable monomer;

w represents from 20 to 85 weight percent;

x represents from 5 to 65 weight percent;

y represents from 5 to 50 weight percent and;

z represents from 2 to 10 weight percent.

3. The element of claims 1 or 2 wherein:

B represents polymerized tetrahydrofurfuryl methacrylate, n-butyl acrylate, methoxyethyl acrylate, ethyl acrylate or methyl methacrylate;

C represents polymerized methacrylic acid and

D represents polymerized N-(2-methacryloyloxyethyl)-N,N,N-trimethylammonium methosulfate; N,N,N-trimethyl-N-vinylbenzylammonium chloride or N-(3-methacrylamidopropyl)-N,N,N-trimethylammonium chloride;

w represents from 30 to 70 weight percent;

x represents from 10 to 43 weight percent;

y represents from 10 to 30 weight percent and;

z represents from 2 to 10 weight percent.

4. The element of claim 1 or 2 wherein the polymer is selected from the group consisting of poly(vinyl acetate-co-tetrahydrofurfuryl methacrylate-co-methacrylic acid-co-N-2-methacryloyloxyethyl-N,N,N-trimethylammonium methosulfate) (55/20/20/5);

poly(vinyl acetate-co-tetrahydrofurfuryl methacrylate-co-methacrylic acid-co-N-2-methacryloyloxyethyl-N,N,N-trimethylammonium methosulfate) (65/20/10/5);

poly(vinyl acetate-co-n-butyl acrylate-co-methacrylic acid-co-N-2-methacryloyloxyethyl-N,N,N-trimethylammonium methosulfate) (60/20/15/5);

poly[vinyl acetate-co-tetrahydrofurfuryl methacrylate-co-methacrylic acid-co-N-(3-methacrylamidopropyl)-N,N,N-trimethylammonium chloride] 55/20/20/5);

poly(vinyl acetate-co-tetrahydrofurfuryl methacrylate-co-methacrylic acid-co-N,N,N-trimethyl-N-vinylbenzylammonium chloride) (55/20/20/5) and poly(vinyl acetate-co-methoxyethyl acrylate-co-methacrylic acid-co-N-2-methacryloyloxyethyl-N,N,N-trimethylammonium methosulfate) (60/20/15/5).

5. The element of claim 1 or 2 wherein the polymer is loaded with a hydrophobe.

6. The element of claim 1 or 2 wherein the support is cellulose acetate.

7. A method of forming a coating from a latex composition comprising the steps of:

(a) preparing a latex composition comprising an aqueous continuous phase having dispersed therein polymer particles;

(b) coating the composition of (a) on a support; and (c) removing substantially all water from the coating; characterized in that the polymer comprise random recurring units having the structures:

$-(A)_w, -(B)_x, -(C)_y$ and $-(D)_z$ wherein;

A represents polymerized vinyl acetate;

B represents a polymerized acrylate or methacrylate monomer capable of copolymerization with vinyl acetate;

C represents a polymerized, carboxyl group-containing vinyl monomer which forms a water-insoluble homopolymer;

D represents a polymerized cationically charged copolymerizable monomer;

w represents from 20 to 85 weight percent;

x represents from 5 to 65 weight percent;

y represents from 5 to 50 weight percent and;

z represents from 0 to 15 weight percent.

8. The process of claim 7 wherein the support is cellulose acetate.

9. The process of claim 7 wherein the support is cellulose acetate and the polymeric latex coating is overcoated with a coating of poly(methyl methacrylate).

* * * * *